United States Patent [19]

Brandsma et al.

[11] Patent Number: 4,553,234
[45] Date of Patent: Nov. 12, 1985

[54] METHOD AND SYSTEM OF TRANSMITTING DIGITAL INFORMATION IN A TRANSMISSION RING

[75] Inventors: Johan R. Brandsma; Alphons A. M. L. Bruekers; Jozef L. W. Kessels, all of Eindhoven, Netherlands

[73] Assignee: U.S. Philips Corporation, New York, N.Y.

[21] Appl. No.: 566,945

[22] Filed: Dec. 30, 1983

[30] Foreign Application Priority Data

Jan. 6, 1983 [NL] Netherlands ................. 8300033

[51] Int. Cl.$^4$ ............................................. H04J 3/00
[52] U.S. Cl. .................................... 370/86; 370/89
[58] Field of Search ............... 370/86, 89; 340/825.05

[56] References Cited

U.S. PATENT DOCUMENTS

| | | | |
|---|---|---|---|
| 4,071,706 | 1/1978 | Warren | 370/89 |
| 4,154,983 | 5/1979 | Pedersen | 370/89 |
| 4,227,178 | 10/1980 | Gergaud | 370/86 |
| 4,251,880 | 2/1981 | Baugh et al. | 370/89 |
| 4,383,315 | 5/1983 | Torng | 370/89 |
| 4,423,507 | 12/1983 | Roger et al. | 370/89 |
| 4,482,999 | 11/1984 | Janson et al. | 370/86 |

OTHER PUBLICATIONS

"A ROM Controlled LSI Sequencer for Digital Data Subscriber Loop Transmission Equipment", T. Ohyama et al., Conference: NTC '81 Innovative Telecommunications-Key to the Future, New Orleans, LA. 11/29–12/3/81.

Primary Examiner—Douglas W. Olms
Assistant Examiner—Kenneth I. Rokoff
Attorney, Agent, or Firm—Thomas A. Briody; William J. Streeter

[57] ABSTRACT

The invention relates to a broad-band, time-division multiplex, token-passing, ring local area network, with which both circuit-switched and packet-switched traffic, namely data, text, picture and speech traffic can be supported. The invention has for its object to provide a method of transmitting digital information in a ring having a comparatively high transmission capacity with which rapid access to the common ring transmission means can be obtained, without however high requirements being imposed on the processing speed of the stations. According to the invention this is in principle achieved by means of a method which guarantees that per time-division multiplex frame only one time slot, which is known to the station, needs to be accessed.

22 Claims, 7 Drawing Figures

FIG.7

METHOD AND SYSTEM OF TRANSMITTING DIGITAL INFORMATION IN A TRANSMISSION RING

A. BACKGROUND OF THE INVENTION

A(1). Field of the Invention

The invention relates to a method and a system of transmitting digital information between a plurality of stations which are coupled to a unidirectional transmission ring. The ring comprises a monitor for generating a frame in the ring, in which frame a plurality of types of time slots can be distinguished, which types differ from each other in the number of bits which can be accommodated in the time slots. Time slots of the same type in consecutive frames providing together a corresponding number of numbered channels for transmitting the digital information between the stations.

Developments in communications techniques are characterized by an ever increasing diversification in the type of traffic to be processed. Since telegraphy, the communication service for written words, telephone, communication service for spoken words, and facsimile, the communication service for transmitting picture information there came into being in the last tens of years, parallel with the development of the computer, traffic: data between computers and between computers and computer stations. Partially the situation was that for each type of traffic a separate, often wire-commited, network was installed. In the last few years, a position has been made available in the existing services for new services. Thus, for the joint transmission of word and picture information the telephone line was utilized (videophone). The telephone line was also utilized for the transmission of computer data, for example for requesting and displaying data on a television screen at the subscriber (viewdata), or the inputting and outputting of data by means of a terminal for a remote computer.

As the possible services become increasingly numerous the need has recently arisen for networks which are capable of supporting a wide variety of these services. Starting point is the idea that in a geographically limited area, such as a factory, office, laboratory, university etc. an infrastructure is found which renders it possible to have access to that large variety of services. The networks proposed for that purpose, commonly denoted local area networks, are in essence formed by a transmission means, often a cable, which is laid as a fine mesh over the geographical area to be covered and over which stations can be connected to communicate with each other. A station may be a telephone set, a keyboard with picture screen, a computer, a word processor, etc. The digital information transmitted by the station over the transmission means may consequently consist of (a train of) digital speech samples or a data packet.

The proposed local area networks, LAN's for short, can be distinguished from each other by a number of features. In the first place, as regards topology of the transmission means, a distinction can be made between ring, bus and loop transmission means. A looped transmission means is obtained when a loop is formed from a central station through a large number of users stations back to the central station. With a bus means the stations are connected to the means which is terminated at both ends. In a bus and also in a ring transmission means the stations are interconnected without the existence of, or processing by, a central station. The characteristic feature of a ring transmission means is that the information, once it is present on the ring can circulate for an unlimited period of time without further measures as the ring behaves as a circulating memory. The transmission of new information is effected by overwriting a memory location in the circulating memory. A further distinguishing feature is the manner in which the stations get access to the means. This may occur in the "contention" or the "non-contention" mode. With a contention access strategy (such as, for example CSMA-CD) it may happen that more than one station transmits simultaneously over the means causing the messages of both stations to be mutilated. With a non-contention access strategy, (for example, in "token passing" techniques) it is always guaranteed that not more than one station can transmit at the same time. A further distinction is that the frequency band of the transmission means can be utilized in the baseband or in the broadband mode. The broadband mode is defined as the mode in which a plurality of different signals are simultaneously present on the means (for example by means of time or frequency-division multiplex) without these signals interfering with each other.

Finally, LAN's can be distinguished from each other according to the type (or types) of traffic capable of being supported by the local area network: full duplex circuit-switched traffic for supporting, for example, telephone and videophone traffic and/or packet-switched traffic for supporting data traffic.

The invention relates to a broadband, token passing, local area network ring, with which both circuit and packet-switched traffic can be supported.

A(2). Description of the prior art

The publication mentioned sub D(1) discloses a local area network ring in which the transmission capacity on the ring is made available for the stations connected thereto in the broadband, more specifically in time division multiplex. In addition, the ring comprises what is commonly referred to as a "loop synchronizer" which ensures that a frame structure is provided on the ring. For that purpose the loop synchronizer comprises a buffer which increases the propagation time of a signal on the ring until it has a duration of accurately one frame or a multiple thereof. The frame structure is arranged such that circuit-switched traffic, namely two 2 Mbit/s video conference channels and 48 telephone channels of 64 kbit/s each and message-switched traffic, namely one data link between 1 Mbit/s computers can be supported. The access to the transmission means (optical fibre) for the circuit-switched traffic is regulated by means of tokens which are circulated through the ring token channels therefor. Each circuit-switched channel has its own token channel by means of which the access to that channel is regulated.

In addition, the loop synchronizer provides that the beginning of a frame is marked, which renders it possible to identify the channels in the frame by counting from the initial mark.

Such a system has the disadvantage that reserving an information channel of a given category implies that in principle all the token channels of the relevant category must be inspected. This imposes either high requirements on the processing rate of the station if all channels of each passing frame must be monitored, or the time required to obtain access becomes comparatively long if the station monitors a token channel only once per passing frame, so that the transmission means is not utilized optimally.

B. SUMMARY OF THE INVENTION

B(1). General

The invention has for its object to provide a method and a system of transmitting digital information, with which a fast access to the common ring-shaped transmission means is obtained without the necessity to impose severe requirements on the processing rate of the station requiring access.

According to the invention, the method of transmitting digital information between a plurality of stations of the type described in the preamble, comprises at least one time slot for transmitting the channels numbers to be utilized from the monitor to the stations and that the relevant corresponding time slots in consecutive frames form together a monitor transmit channel. At least one time slot per frame is provided for transmitting channel numbers which are not currently utilized from the stations to the monitor, and the corresponding time slots in consecutive frames form together a monitor receive channel, that at least one time slot, the message field, is provided for transmitting protocol messages from one station to another and that the method comprises the following steps:

1. a station which, to obtain a channel to be utilized, reads a channel number from the time slot of the monitor transmit channel and enters a dummy channel number ("nihil");
2. the preceding step is repeated until the read channel number is a "non-nihil" channel number;
3. the station transmits the obtained channel number to be utilized to the address station;
4. the station repeatedly writes a sub-packet of digital information in the transmission ring into a time slot of the channel obtained;
5. the addressed station repeatedly reads the sub-packet of information from a time slot of the given channel in the ring;
6. the channel number which is no longer required after the transmission of the digital information is written into a time slot of the monitor receive channel, the channel number present there being read;
7. the preceding step is repeated with the read information until the channel number read is a "nihil" channel number.

An advantage of the invention is that in order to obtain access to a channel of the ring a station needs to access only one time slot (the monitor transmission channel) per frame, as a result of which a comparatively long processing time for these data, namely one frame period, is available for the station. As a result thereof it is possible to have the access procedure effected by a standard micro-processor.

An additional advantage of the invention is that simultaneously both a plurality of circuit-switched information channels and a plurality of packet-switched information channels can be supported by the ring, the latter in contradistinction to the system described in reference D(1) in which not more than one message-switched channel is present.

A system of transmitting digital information between a plurality of stations of the type described in the preamble, according to the invention, includes a frame which comprises at least one time slot for transmitting the channel numbers to be utilized from the monitor to the stations and that the relevant corresponding time slots in consecutive frames form together a monitor transmit channel. At least one time slot per frame is provided for transmitting channel numbers which are no longer utilized from the stations to the monitor, and the corresponding time slots in consecutive frames form together a monitor receive channel. At least one time slot, the message field, is provided for transmitting protocol messages from one station to another station. A station comprises the following means:

channel number swapping means which in order to obtain a channel to be utilized, repeatedly read a channel number from the time slot of the monitor transmit channel and enter there a dummy channel number ("nihil") until the read channel number is a "non-nihil" channel number;

transmitting means for transferring the obtained channel number to be utilized to the addressed station;

information writing means for repeatedly writing a sub-packet of digital information in the transmission ring into a time slot of the channel obtained;

information reading means for repeatedly reading the sub-packet of information in a time slot of the given channel in the ring, and that the said channel number swapping means for repeatedly writing the channel number which is no longer required after the transmission of the digital information into a time slot of the monitor receive channel, the channel number present there being read the read channel number is a "nihil" channel number.

B(2). Packet-switched traffic

For the case in which a channel to be utilized by a station falls within the packet-switched category it is advantageous, according to the invention, that the channel number meant in step 3 is transferred in a message field and, in addition, that an identification of the transmitting station and an identification of the addressed station are transmitted in the message field.

An advantage of the invention is that stations for determining communication wishes of other stations, relevant to them, need only access one time slot per frame (the message field), which results in a processing time for these data of likewise one frame period being available for the addressed stations, as the data concerning communication wishes of all the stations are circulated in this way in the ring, as a result of which each free station has the opportunity to determine whether it is addressed (in that case the free station finds its identification in the message field), by which station it is addressed (identification of the transmitting station) and which information channel (channel number) the transmitting station has acquired for that purpose.

It is a further object of the invention to provide a method of transmitting digital information with which the progress control and the error control for the packet-switched traffic can be effected in a simple way. This object is accomplished in that, according to the invention, the digital information for transmission in packet-switched channels is divided into packets of a predetermined maximum length, the packets each comprising a plurality of sub-packets of a predetermined length. The message field utilized in step 3 further comprises a first sub-field for indicating the number of sub-packets contained in a packet, a second sub-field for indicating whether the packet to be transmitted is the last packet or not, and a third sub-field for accommodating the channel number. The length (number of bits) of a sub-packet corresponds to the capacity of the time slot of the type utilized.

By dividing the information into packets it is rendered possible that the transmission means in the event of long information messages is not uninterruptedly assigned to a station. At the same time in the event the packets leave the stations or enter the stations, as the case may be, in buffered form these buffers may be of a limited size.

It is advantageous that when at step 6 the channel number is no longer required (namely when the last sub-packet of a packet has been transmitted) the steps 6 and 7 are effected by the addressed station and that the addressed station reports in a message field to the transmitting station that it has or has not received the packet correctly.

Reporting by the addressed station that the reception was correct or not correct is advantageous for both the progress control and the error control: In the progress control correct reception is not reported until the addressed station is ready to receive a subsequent packet. In the error control when a packet for whatever reason is received incorrectly it is reported to the transmitting station so that retransmission can be effected.

To test the transmission and detection of the information packets for correctness it is advantageous to provide a packet with an error detecting code which is transmitted together with the last sub-packet of the packet.

If information messages are divided into two packets and a channel is, as it should be, only reserved for the duration of one packet, then the possibility is not excluded that packets associated with different messages, coming from different stations but intended for one and the same station are interleaved. Since a receiving station is only capable of reading one sub-packet per frame, and if doing so, does not read message fields, this might result in packets and messages being lost. A similar problem occurs because the packets have been divided into sub-packets.

The invention has also for its object to provide a method of transmitting digital information messages in which loss or interleaving of packets from messages addressed to one and the same station but coming from different transmitting stations is prevented from occurring.

According to the invention, this method provides for each frame a further time slot reserved for transmitting receiver arbitration messages between the stations. Corresponding time slots in consecutive frames form together an arbitration channel and a receiver arbitration message comprises a receiver address and an arbitration indicator. Step 1 of the method is preceded by the following steps of the station that wants to transmit information:

(i) a station wishing to transmit information reads the content of a time slot of the arbitration channel and writes into that time slot the address of the desired receiver station [REC] with as an arbitration indicator the value "false";

(ii) the content of the read time slot of the arbitration channel is repeatedly replaced by the content of a time slot of the arbitration channel in the preceding frame until [REC] is read with as an arbitration indicator the value "true";

(iii) the transmitting station knows thereafter, that the addressed station is reserved to it; and that each free station performs the following steps:

(iv) a free station reads the content of a time slot of the arbitration channel and writes its own address into that time slot and gives the arbitration indicator the value "true";

(v) a free station replaces the content of the read time slot of the arbitration channel by the content of a time slot of the arbitration channel in the preceding frame until its own address is read and the arbitration indicator has the value "false";

(vi) the free station which has read its own address and an arbitration indicator having the value "false" is adjusted to the position "occupied".

B(3). Circuit-switched traffic

It is an object of the invention to provide a method of transmitting digital information with which circuit-switched traffic is supported and with which signalling for that traffic is effected in a simple and efficient way.

According to the invention, in the event that the channel to be utilized is of a first, circuit-switched category, step 3 of the method comprises the following sub-steps:

a. the station reads a channel number from a second, packet-switched category in the relevant time slot of the monitor transmit channel and writes there a "nihil" channel number;

b. step a is repeated until the read channel number is a "non-nihil" channel number;

c. the station transmits the obtained channel number of the packet-switched category to the addressed station in a message field;

d. the station transmits in the packet-switched channel the channel number to be utilized of the first-circuit switched category, and also any further customary signalling data;

d. the channel number of the second, packet-switched category which number is no longer required after the transmission of the data specified in step d, is written into a time slot of the relevant monitor receive channel, the channel number present there being read;

f. the preceding step is repeated until the read channel number is an "nihil" channel number.

An advantage of the invention is that by employing the packet-switched channels present for signalling for the benefit of the circuit-switched traffic (for example telephony traffic) an optimum use is made of the categories of channels provided, as the message or signalling portion for, for example, a telephone connection is completed in a channel which is eminently suitable therefor: a packet-switched channel.

A further advantage is that, since the packet-switched channel is used only very briefly during a telephone call also signalling messages from other stations can be received, which may be useful in view of certain new services.

C. SHORT DESCRIPTION OF THE FIGURES

Embodiments of the invention and its advantages will be further explained with reference to the drawings in which corresponding components are given the same reference symbols.

Therein.

D. REFERENCES

1. Giozza, W. F. and Noguez, G. "Fipnet: a 10 Mb/s fiber optics local network", Comp. Comm. Rev. (ACM) vol. 12, no. Apr. 2, 1982, pp. 6-19
2. Wilkes, M. V. and Wheeler, D. J., The Cambridge digital communication ring, Proc. Local Area Communications Network Symposium, Boston, U.S.A., May 1979, pp. 1-14.

E. DESCRIPTION OF THE EMBODIMENTS

E(1). General

Figure 1:
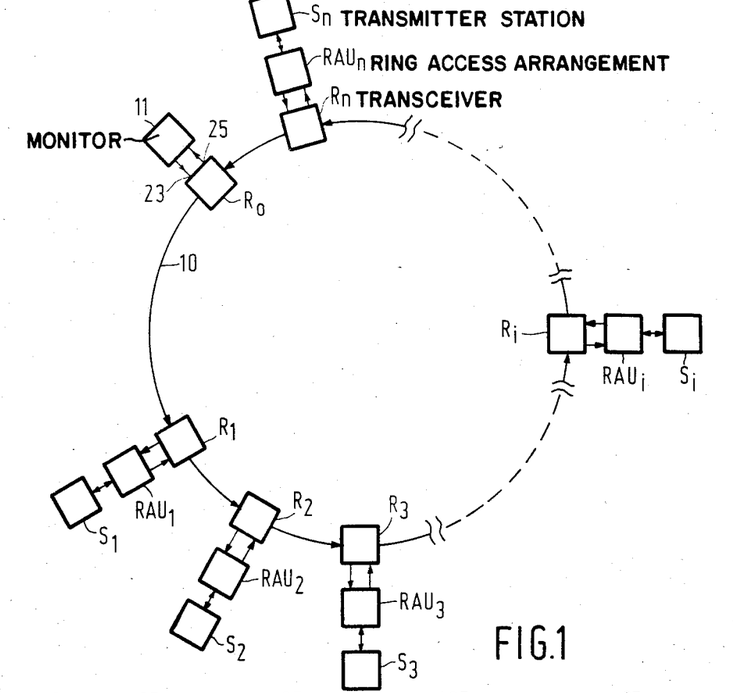
FIG. 1 is a representation of a ring-shaped transmission means to which stations are connected which are capable of transmitting information to each other in accordance with the method according to the invention.
Figure 2:
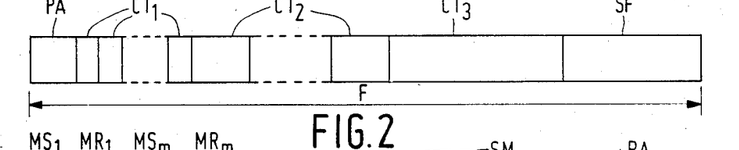
FIG. 2 is a graphic representation of the layout of a frame used in the method according to the invention.

FIG. 1 shows a ring-shaped unidirectional transmission means 10 which may, for example, comprise optical fibres, coaxial cables or twisted wires. Transceivers $R_i$, i=1,2 ... n are included in the ring, for the purpose of transmitting and receiving signals and to maintain the signal intensity on the ring at an adequate level. Stations $S_i$,=1, 2, ... n are connected to the transceivers $R_i$ by ring access arrangements $RAU_i 1, \ldots n$. A station may, for example, be a telephone set, a computer terminal, a word processor, a data transmitter or data receiver etc., as the case may be. A monitor 11 which performs a plurality of functions is connected to the ring through a transceiver $R_o$. The monitor generates, for example, a frame structure on the transmission means. FIG. 2 shows an example of such a frame structure. A frame having a duration F comprises a preamble PA which indicates the beginning of the frame, and in addition a plurality of time slots in which digital information is transmitted. The time slots do not all have the same duration: In the example shown in FIG. 2 time slots of a first type, a second type and a third type can be distinguished. Time slots in consecutive frames provide a channel, each time slot of the first type forming part of a channel of the first type, each time slot of the second type forming part of a channel of the second type and each time slot of the third type forming part of a channel of the third type.

It should be noted that the terms "frame", and "time slot" used here have a meaning which is not fully covered by the usual definition of these terms. At one and the same instant different stations can access different time slots, associated with one specific frame, while conversely one specific time slot in one frame can be accessed by all the stations at different instants.

In FIG. 2 the channels of the first, second and third types, respectively are indicated by $CT_1$, $CT_2$ and $CT_3$, respectively. In addition, each frame F comprises a field SF in which a number of time slots are accommodated for transmitting the system and control information. By way of example, the following arrangement of a frame F may be used.

Duration of the frame: 125 μsec.

Bit rate: 20.48 Mb/s; thus, each frame comprises 2560 bits.

Arrangement of the frame:

| | |
|---|---|
| 32 channels of a first type (64 kb/s); | 256 bits |
| so per frame 32 time slots of 8 bits each 4 channels of a second type (256 kb/s); | 128 bits |
| so per frame 4 time slots of 32 bits each 3 channels of a third type (2 Mb/s); | 768 bits |
| so per frame 3 time slots of 256 bits each 1 channel of a fourth type (8 Mb/s); | 1024 bits |
| so per frame 1 time slot of preamble | 64 bits |
| field SF | 320 bits |
| total | 2560 bits. |

The arrangement of a frame is wholly arbitrary; a greater or lesser number of types of a channel may be present and a greater or lesser number of channels per type may be provided. Also the exact position of the channels in the frame is fully arbitrary. All stations must of course know this arrangement.

Figure 3:
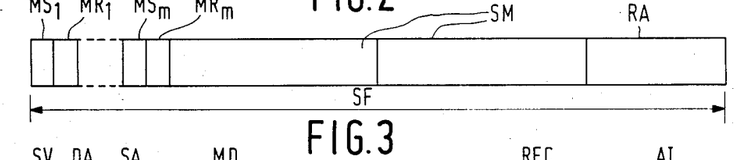
FIG. 3 shows a detail of the frame lay-out as shown in FIG. 2.

The field SF for transmitting system and control information is further subdivided as shown in FIG. 3. The field comprises m monitor transmit channels $MS_1 \ldots MS_m$ and an equally large number of m monitor receive channels $MR_1 \ldots MR_m$. In the monitor transmit channels $MS_i$, one channel number per time slot is transmitted of the channels which are "free" while in the monitor-receive channels $MR_i$ on channel number which has been released is transmitted per time slot. It is then advantageous to provide for the monitor transmit channels $MS_1$ to contain per time slot a free channel number from the group of channels of the first type $CT_1$, the monitor transmit channel $MS_2$ a free channel number from the group $CT_2$ etc., while the monitor receive channels $MR_1$ may each contain in a corresponding way a released channel number from a group of channels of the type 1.

As described above, a frame has time slots of a number of different types, which types may differ in the number of bits transmitted per time slot, so the average bit frequency of the relevant channel. At the same time, the time slots differ, however, in the category of traffic supported, namely circuit-switched traffic or packet-switched traffic. Circuit-switched traffic, such as telephone and video traffic, requires that strictly periodically, uninterruptedly and as long as desired a connection remains in existence between, usually, two-stations and moreover usually in both directions simultaneously (full duplex). Different requirements are imposed on packet-switched traffic (text, facsimile, data-link to computer) and it is therefore often advantageous to process this category of traffic in a manner different from circuit-switched traffic. In paragraph E(2) it will be described more specifically how packet-switched traffic on the ring is supported, while paragraph E(3) will be devoted more specifically to circuit-switched traffic.

E(2). Packet-switched traffic

If now a station $S_i$ wants to transmit information by the transmission means, then the station must reserve a free channel from the groups of channels of the desired type. Let it be assumed that the station $S_i$ requests a channel of the first type $CT_1$ then the method proceeds as follows. The station $S_i$ reads the channel number present in the passing frame in the time slot $MS_1$ and writes (quasi) simultaneously a "nihil" channel number there. If the read number is not "nihil" then the reservation is a fact. If, on the contrary, the read number is a "nihil" number, then this procedure is repeated in subsequent frames until a suitable channel number has been obtained. Reading and (quasi) simultaneously writing is a procedure which corresponds to swapping the content of a time slot on the ring for the content of a digital information message prepared by the station. This procedure is often employed, as will become apparent hereinafter.

Figure 4:
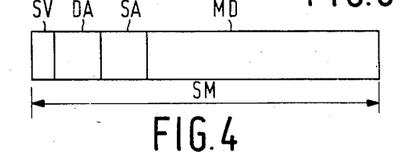
FIG. 4 shows a further detail of the frame lay-out as shown in FIG. 3.

In order to transmit the information message from station $S_i$ to the desired station, for example $S_j$, then that station must be informed of that intention, as well as of the type and the channel number station $S_i$ will employ. To effect this, the field SF comprises one or more message fields SM (FIG. 3) for transmitting protocol messages from one station to the other. The message field SM is arranged as shown in greater detail in FIG. 4. It comprises a start field SV, an address field for defining the transmitting, SA, and the addressed station, DA, and a message field MD. Prior to the transmission of a packet, station $S_i$ will transmit a message field SM, the station identification of $S_i$ being included in the address field SA, the station identification of $S_j$ in the address field DA and, for example, the type and the number of the channel to be employed being included in the message field MD. The station $S_j$, detecting its own station identification, reads, non-destructively, the content of the message field and will prepare itself for receiving information messages in the indicated channel of the likewise indicated type. The message field SM is then marked by the transmitting station as being "empty", by applying such an indication in the start field SV. This indication in the start field SV can be in the form of one single bit. In a subsequent "empty" message field suitable for that purpose, the station $S_i$ may again express the wish that it wants communication. In the literature, see Ref. D(2) this method is known as the "empty slot" or "empty packet" method. A further method, also described in Ref. D(2) is the method in which the content of a time slot is read unconditionally, while its own information then replaces this time slot content. The read content is processed by the station or, if it was not intended for the station which read the content, it is returned in a subsequent frame in the relevant time slot to the transmission medium. This method is known as the "register insertion" method and is the method which is preferably used in the method according to the invention.

After $S_i$ has reported the channel number to $S_j$, it will be possible for the station $S_i$ to transmit the digital information message by the relevant channel. For that purpose the information message is subdivided into packets, these packets themselves being divided into sub-packets, each having a number of bits equal to the capacity of the time slot of the channel of the chosen type. Then, in each frame a sub-packet of digital information is transmitted from station $S_i$ to $S_j$. When a packet has been completely transmitted then the channel number utilized for transmitting the information message is released, namely in the following manner. The station $S_j$, it still being assumed that it is a channel of the first type $CT_1$, writes into a time slot of the monitor receive channel, $MR_1$, the channel number which is no longer required, the station reading the channel number present there. If the read channel number is a dummy number ("nihil"), then the procedure has ended. If the read channel number is, in contrast therewith, a non-nihil number then the procedure is repeated until a nihil number is read.

As will be described in further detail hereinafter, the monitor 11 comprises means for distributing free channel numbers and for collecting and redistributing channel numbers fed-back to it, or channel numbers which are required no more or were not used. To that end, the monitor 11 replaces in each frame again any nihil channel numbers present in the time slots of the monitor transmit channels with channel numbers which are still free. Any fed back, unused channel numbers are also added to the stock of free channel numbers. The monitor then retrieves free channel numbers still present from the stock, which stock is replenished by the channel numbers which are no longer required and were received through the monitor receive channel.

Although in the foregoing it was assumed that per type of channel a monitor transmit and a monitor receive channel are available, it is of course alternatively possible that only one monitor transmit and one monitor receive channel suffice for all the channels of all types together, provided the channel numbers can be identified unambiguously. One channel can even suffice, serving both as the transmit and the receive channels.

As regards the indication in the starting field SV that the message field SM is empty or not empty, the following should be noted. If station $S_i$ requires a message field, station $S_i$ reads the indicator from a starting field passing through it, while (quasi) simultaneously the indicator is given the value "filled". The value of the read indicator is thereafter determined by the station $S_i$. If the indicator has the value "not filled" then the relevant message field (or the corresponding message field in the subsequent frame) can be used by station $S_i$. As the indicator in the start field has been given the value "filled", no other station can successfully claim this message field. If, on the contrary, the read indicator has the value "filled", then the message field cannot be used and the above described procedure can be repeated in a subsequent frame or a subsequent message field in the same frame, as the case may be. It will be obvious that alternatively the "register insertion method" can be employed.

Since the information messages are subdivided into smaller units (packets and sub-packets) so as to enable an efficient utilization of the transmission capacity and consequently portions of messages from different transmitting stations are transmitted in time-division multiplex in the ring, messages are actually transmitted simultaneously. In order to prevent messages from different transmitting stations from being simultaneously transmitted to one and the same receiving station, arbitration on a receiving station is necessary. A receiving station is then permanently assigned to one transmitting station for the duration of an information message, while other stations wanting to transmit information to that receiver will be prevented from doing so. Otherwise, mixing messages transmitted from different transmitting stations to one receiving station can occur, both as regards packets and subpackets. Due to this mixing, packets (or sub-packets) can get lost and/or be received interleaved, as after the transmission of a packet the channel through which the transmission has been effected is released again. For the subsequent packet of the same information message a channel is reallocated in the above-described way. Thus, an other station would get the opportunity to transmit itself a packet to that station. Thus, if no arbitration on the receiving station were used, packets belonging to different information messages would consequently be capable of reaching in succession the receiving station. Otherwise, the size of a packet is a quantity which can be chosen relatively randomly and depends on the capacity of the buffer in the (receiving) stations.

Since each packet is sub-divided into sub-packets whose size determines the bit frequency of the relevant channel, sub-packets associated with different information messages can reach in succession and interleaved the same receiving station, but in different channels. Since the receiving station processes only one channel per frame, message fields and sub-packets from other transmitting stations might get lost. So also for these reasons arbitration on a receiving station is a necessity.

Figure 5:
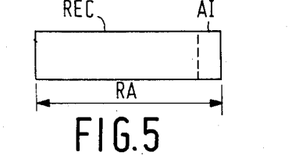
FIG. 5 shows a further detail of the frame lay-out as shown in FIG. 3.

To enable this arbitration, each frame comprises a time slot RA (FIG. 3) for transmitting receiver arbitration messages, a receiver arbitration message comprising an address [REC] which can be accommodated in a sub-field REC (FIG. 5), and an arbitration indication which may have the value T or F which can be accommodated in a sub-field AI. The method of arbiting a received station is as follows. Let it be assumed that $S_i$ is the station wishing to transmit information, denoted "transmitter", hereinafter for the sake of brevity to a station $S_j$ denoted "receiver" hereinafter. The transmitter writes the address of the receiver $[S_j]$ into sub-field REC and gives the arbitration indicator AI the value "not true" (F or "false"). The contents contained in the time slot RA and read and stored in the transmitter will be returned at a subsequent occasion (in a subsequent frame) to the ring.

The transmitter repeats this swapping procedure until it has read in a frame the arbitration message $[S_j,$ true] ($[S_j,$ true] means that in time slot RA the address [REC] and the arbitration indicator having the value "true" is read).

Provided it is not (no more) occupied, a receiver $S_j$ puts the arbitration message $[S_j,$true] on the ring. The read arbitration message is swapped by receiver $S_j$ in the subsequent frame for the arbitration message present in that frame. The receiver $S_j$ repeats this procedure until it reads in a frame the message $[S_j,$false] and then knows that it is occupied. The receiver does not know yet the transmitter by which it is occupied. To that end, the identity of the transmitter $S_i$ and the channel number to utilized first are transmitted in a message field SM in the above-described manner to the receiver $S_j$.

The arbitration procedure is described in appendix F(1) in the programming language PASCAL.

This mode of arbitration will be particularly adequate for those cases in which comparatively many stations communicate for a comparatively long period of time. If this is not the case, then this mode of arbitration is not very attractive because the arbitration requires a great deal of time, as each free receiving station and each transmitting station wishing to transmit information continuously inserts its arbitration message into the ring. The time of propagation of an arbitration message through the ring (that is to say the time required by an arbitration message to return to its transmitter) increases with each station which inserts arbitration message in the ring, more specifically for each station by the duration of one frame. Thus, the "arbitration ring" is, as it were, expands.

A method adequate for this purpose is as follows. The method is started as described above. If, however, $S_j$ recives an arbitration message with the content $[S_j,F]$ then it is tried, not continuously but only twice in the same way to reserve the receiver $S_j$. If not, then the transmitter $S_i$ removes its arbitration message from the ring and only reads the arbitration messages in the ring. The propagation time of the arbitration messages in the ring is not affected by the reading operation. Not until the transmitter has seen a message from the receiver (i.e. a message with the content [REC, true], a new attempt is made to reserve the receiver by placing [REC, false] on the ring once. Should this attempt again be unsuccessful then the transmitter returns again to the reading mode.

A receiver performs the dual protocol. A receiver $S_j$ which becomes free puts a message $[S_j,$ true] on the ring and continues the swapping operation until it receives back a message which has the value $S_j$ in the RA-field. If therein the arbitration indicator is "false", then the receiver knows it is reserved. When, however, its own message is returned to it then the above-described operation is repeated one further time. If the station is then still not reserved, it proceeds to the waiting mode, (i.e. the reading mode) until a request for it from a transmitter passes. Thereafter the receiver once again puts $[S_j,$ true] on the ring and will now receive in return $[S_j,$ false] and consequently will be reserved.

This arbitration procedure is shown in appendix F(2) in the programming language PASCAL.

E(3). CIRCUIT-SWITCHED TRAFFIC

In circuit-switched traffic a station must be given the possibility of obtaining a channel for an unlimited period of time, at least for such a long time as that specific channel is required by the station. Dividing an information message into two packets is not possible. A regular flow of sub-packets between the stations maintaining circuit-switched traffic is necessary. For telephone traffic a sub-packet will generally be formed by one speech sample, which means that it consists of 8 bits, and such a sub-packet must be transmitted regularly, that is in each frame. In customary full-duplex telephone traffic one speech sample must preferably be transmitted per frame from station $S_i$ to $S_j$ and one speech sample from $S_j$ to $S_i$.

A channel from the circuit-switched traffic category is obtained as follows. Let it be assumed that station $S_i$ wishes a (telephone) connection to station $S_j$ then station $S_i$ will first, in a manner similar to the manner described for packet-switched traffic, allocate a channel number from the circuit-switched category. The (speech) information will afterwards be transmitted through that channel. In order to inform station $S_j$ of the fact that station $S_i$ wants a connection, a packet-switched channel is thereafter allocated by station $S_i$ (also in the above-described way which is customary for message-switched traffic). In the event a telephone connection is concerned, the then customary signalling data are transmitted to station $S_j$ by the packet-switched channel, one of these data being the channel number of the circuit-switched channel to be utilized. After each signalling message the packet-switched channel is released, and, if necessary a packet-switched channel is acquired again. Depending on the result of the signalling phase a circuit-switched channel can thereafter be opened between the stations $S_i$ and $S_j$. Signalling or other messages are also transmitted during or at the end of the circuit-switched traffic, each through a packet-switched channel. These stations $S_i$ and $S_j$ can of course receive during the circuit-switched connection through packet-switched channels messages which may alternatively originate from other stations. For some new services this may be useful.

Contrary to the packet-switched traffic, no error and/or progress control can be effected for the circuit-switched traffic.

Full-duplex traffic is performed such that the sub-packet written-in by station $S_i$ in a time slot of the relevant channel is ready by station $S_j$, while $S_j$ inserts a sub-packet in that specific time slot.

E(4). DESCRIPTION OF AN EMBODIMENT OF A MONITOR

Figure 6:
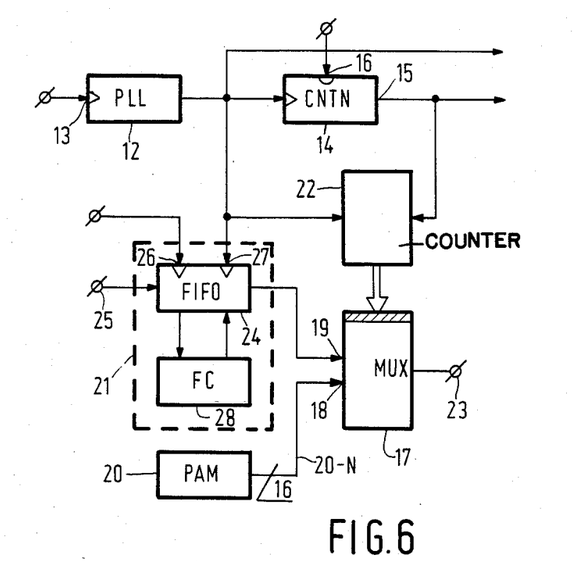
FIG. 6 is an embodiment of a monitor for use in the transmission means shown in FIG. 1.

FIG. 6 shows an embodiment of monitor 11 (FIG. 1). The monitor comprises a phase-locked loop 12 for generating the symbol frequency of the digital signals in the ring. The phase-locked loop 12 has an input 13 for receiving a signal produced by an external clock generator with which loop 12 may optionally be synchronized. The frame frequency is obtained by means of a counter 14 connected to an output of the phase-locked loop 12. Let it, by way of example, be assumed that the symbol frequency is 20.48 MHz and the frame frequency 8 kHz then counter 14 gives an indication at output 15 that the end of a frame has been reached each time 2560 symbols have been counted. In addition, the counter 14 has an input 16 for synchronizing the counter with an, optionally external, frame generator. In addition, the monitor comprises a multiplexer 17 to which is connected a preamble memory 20 through input 18 and an arrangement 21 through input 19. The preamble memory 20 comprises a sequence of bits indicating the start of a frame, which preamble is consequently accommodated in field PA of the frame, as shown in FIG. 2. The preamble which may, for example, consist of 16 bits is connected to the sixteen-fold input 18 of multiplexer 17 through a bus 20-N which in that case is formed by 16 parallel-arranged lines. A further counter 22 an input of which is connected to the output of phase-locked loop 12 is arranged such that, when counting from 0 to 15 inclusive, one of the sixteen inputs 18 are sequentially connected to the output 23 of the multiplexer, while the counter, counting from 16 upwards, connects input 19 to output 23. If a frame contains 2560 bits then counter 22 will keep input 19 connected to output 23 from counting position 16 until counting position 2559.

Arrangement 21 comprises a memory device 24 having an input 25, which is connected to the transmission means 10 (FIG. 1). The bits present in the ring are written into memory device 24 under the control of clock signals applied to input 26 of the memory device 24 and generated from the received signals. Memory device 24 comprises a number of memory locations equal to the number of bits per frame. Memory device 24 is read under the control of the clock signals which are generated by the phase-locked loop 12 which, for that purpose, is connected to an input 27 of memory device 24. From the counting positions 16-2559 produced by counter 22 the addresses are derived with which the multiplexer is addressed in order to convey the bits stored in the memory device to output 23 by input 19 of multiplexer 17. In this way the written-in data, retimed and preceded by a newly generated preamble are again inserted into the ring.

In addition, the arrangement 21 comprises a channel distribution arrangement 28 connected to memory device 24. The channel distribution arrangement 28 reads the content of the monitor-receive channels $MR_1$, $MR_2$ ... $MR_m$ (FIG. 3) and enters there a "nihil" channel number. The channel distribution arrangement 28 also reads the content of the monitor transmit channels $MS_1$, $MS_2$ ... $MS_m$ (FIG. 3) and enters there,—while the supply lasts—unused channel numbers. Any unused channel numbers still remaining in the channel distribution arrangement 28 supplemented with the non-nihil channel numbers present in the monitor transmit and monitor receive channels form the new "pool" of channel numbers from which channel numbers can be drawn for a subsequent frame.

E(5). DESCRIPTION OF AN EMBODIMENT OF A RING ACCESS CIRCUIT

The stations $S_i$, i=1, 2, ... n are connected by ring-access units $RAU_i$, i=1, 2, ... n to the transceivers $R_i$ in the transmission means, as described already with reference to FIG. 1. The transceivers have for their object to receive, restore, overwrite and retransmit the signal in the ring encoded in a suitable code, and to regenerate the bit and frame frequency from the received channel. In the ring-access units operations can thus be effected on the signal bit and frame synchronously.

Figure 7:
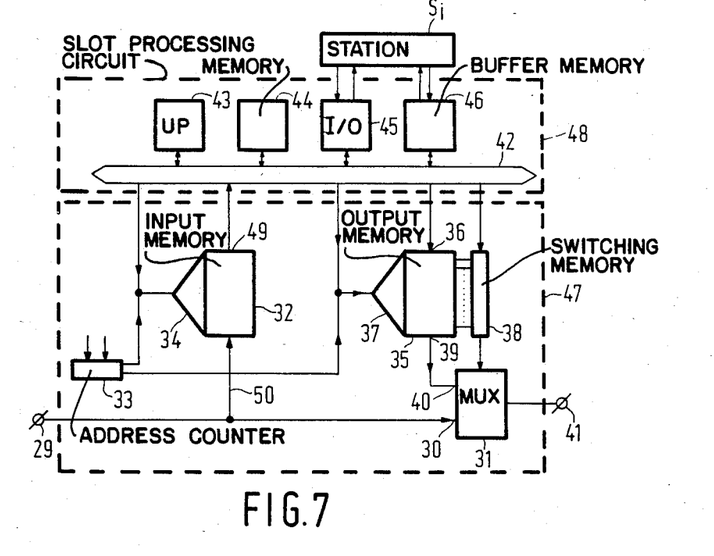
FIG. 7 shows an embodiment of a ring access arrangement according to the invention.

The received, decoded signal is applied to an input 29 of the ring-access unit shown in FIG. 7. This input is connected to a first input 30 of a first multiplexer 31 and to an input of an input memory 32. Frame and bit synchronously, an entire frame is written, for example, byte sequentially, into input memory 32 by means of address counter 33. For that purpose an output of address counter 33 is connected to an input of address decoder 34 of input memory 32. In addition, the ring-access unit $RAU_i$ comprises an output memory 35 which has also the size of an entire frame and in which the information which is going to replace the information present in the ring is written in the desired addresses through an input 36. Addressing the output memory is also effected by the address counter 33, which for that purpose is connected to address decoder 37 of output memory 36. A location in a switching memory 38 corresponds to each location in the output memory 35, these memory locations being addressed simultaneously with the memory locations of the output memory 35. The switching memory 38 has preferably locations which can comprise only 1 bit. To indicate those addresses of the memory locations in the output memory 35 in which information intended to be transmitted in the subsequent frame is written, a "1" is written in the corresponding address in switching memory 38 and a "0" in all the further locations of the switching memory 38. An output 39 of the output memory is connected to a second input 40 of multiplexer 31. Under the control of the switching memory 38 the first input 30 or the second input 40, as the case may be is connected to an output 41 of the multiplexer 31, more specifically in such a way that if a "1" is present in the address location in the switching memory 38, input 40 is connected to the output 41 and if a "0" is present there input 30 is connected to output 41.

A time slot-processing circuit 48 is provided between the above-described frame processing circuit 47 and the station $S_i$. The frame and time slot-processing circuit together form the ring-access unit. The time slot-processing circuit 48 has for its object to read process and transmit to station $S_i$ the incoming information, stored in input memory 32, and to transmit, process and write into output memory 35 the information received from station $S_i$. To that end time slot-processing circuit 48 comprises a microprocessor 43, a memory 44, an input- /output interface 45 and a buffer memory 46, which are all interconnected by a micro-processor bus 42.

Reading the information stored in input memory 32 is effected under the control of the microprocessor 43 for which purpose address decoder 34 is connected to the microprocessor bus 42 for addressing the memory locations of input memory 32. The information is applied to bus 42 by an output 49 of input memory 32. Writing information into output memory 35 and switching memory 38 is effected in a similar way.

The memories 32 and 35 (and 38) are addressed by their respective address decoders 34 and 37 from the "ring-side", that is to say by address counter 33 and from the microprocessor-side by bus 42. Consequently, the memories 32 and 35 should be capable of processing per frame twice as many write/read cycles than there are bits in a frame. The processing rate of the frame and time slot-processing circuit can however easily be reduced by processing the information for example byte-sequentially instead of bit-sequentially. For that purpose a series-parallel converter might then be included in the connection 50 to the input of input memory 32, and output 39 of the output memory 35 might be connected to input 40 of the multiplexer 31 through a parallel-series converter. The time delay introduced between input 29 and output 41 is independent of any series-parallel and parallel-series conversion and has a duration of one bit period. In the example already used in the foregoing, in which a bit rate of 20.48 MHz in the ring was assumed, the memories 32 and 35 must be structured for a rate of $2 \times 20.48/8 = 5.12$ MHz in the event of a byte-sequential processing operation.

F. APPENDIX

F(1). First procedure for receiver arbitration

A station (the sender) that wishes to transmit information effects the procedure shown here below in the programming language PASCAL.

```
procedure : seize receiver (r: receiver address);
var reg: raslot;
begin reg.rec:=r;
reg.priv:=false;
repeat swap (reg, rabucket)
until reg.rec = r and reg.priv
end
```

A free station, so a station to which information can be transmitted (a receiver) effects the procedure shown herebelow.

```
procedure : seize sender
var reg:raslot;
begin reg.rec:=own address;
reg.priv: = true;
repeat swap (reg.rabucket)
until reg.rec = own address and not reg.priv
end
For both procedures it holds that :
type raslot = record rec : receiver address
priv : boolean
end
```

The transmitter continuously "swaps" the content of an arbitration channel time slot ("rabucket") for the content of its register ("reg"); the first time this register contains the address of the desired receiver ("r") and the arbitration indicator ("priv", abbreviation of privilege having the value "false") until that address ("r") has been received back and the arbitration indicator ("priv") has the value "true".

The receiver continuously swaps the contents of a time slot of the arbitration channel ("rabucket") for the content of its own arbitration register ("reg"); the first time this register comprises its own address ("own address") and the arbitration indicator ("priv"), having the value "true" until its own address ("own address") has been received back and the arbitration indicator ("priv") has the value "false".

F(2). SECOND PROCEDURE FOR RECEIVER ARBITRATION

A station (the sender) which wishes to transmit information performs the following procedure, the parameters used having the same meaning as sub appendic F(1).

```
procedure seize receiver (r)
var reg : raslot;
begin reg.rec : = r;
reg.priv : = false;
repeat swap (reg, rabucket)
until reg.rec = r;
if not reg. priv
then repeat swap (reg, rabucket)
until reg.rec = r;
while not reg.priv
do begin repeat read (reg, rabucket)
until reg.rec = r and reg. priv
reg. priv : = false;
repeat swap (reg, rabucket)
until reg.rec = r
end
end
```

A free station, so a station to which information can be transmitted (a receiver) performs the following procedure.

```
procedure seize sender
var reg : raslot;
begin reg.rec : = own address;
reg.priv : = true
repeat swap (reg, rabucket)
until reg.rec = own address;
if reg.priv
then repeat swap (reg, rabucket)
until reg.rec = own address;
if reg.priv
then begin repeat read (reg, rabucket)
until reg.rec = own address;
repeat swap (reg, rabucket)
until reg.rec = own address;
end
end
```

The transmitter procedure originally does not differ from the procedure mentioned sub F(1). If, however, the transmitter has put (and received back) twice with the arbitration value a message "false" on the ring, then the transmitter now continues the procedure by reading only the arbitration messages ("read (reg. rabucket)") and not until the transmitter has seen a message from the receiver passing it, i.e. with arbitration indicator "true" then the "swap" is effected again. The free stations or the stations which have become free, originally also perform the procedure shown sub F(1). After one unsuccessful repetition (the arbitration indicator still has the value "true"),—which means that apparently no transmitter wishes to transmit information to this receiver—the receiver continues by reading only the time slot in which the arbitration messages occur. Not until the receiver has found that a transmitter is not interested (receiver reads its ("own" address")) in the time slot for the arbitration message) the step "swap" is performed again.

What is claimed is:

1. A method of transmitting digital information between a plurality of stations which are coupled to a unidirectional transmission ring having a monitor for generating a frame in the ring said frame comprising a plurality of types of time slots which differ from each other in the number of bits which can be accommodated in the time slots, time slots of the same type forming in consecutive frames a corresponding number of numbered channels for transmitting the digital information between stations, said frame comprising at least one time slot for transmitting the channel numbers to be utilized from the monitor to the stations, and the relevant corresponding time slots in consecutive frames form together a monitor transmit channel, at least one time slot per frame is provided for transmitting channel numbers which are no longer utilized from the stations to the monitor, and corresponding time slots in consecutive frames form together a monitor receive channel, at least one time slot constituting a message field, is provided for transmitting protocol messages from one station to another addressed station, the method comprising the following steps:

(a) obtaining a channel to be utilized by reading at a station a channel number from the time slot of the monitor transmit channel and entering therein a dummy channel number ("nihil");
(b) repeating step (a) until the read channel number is a "non-nihil" channel number;
(c) transmitting from said station the obtained channel number to be utilized to an addressed station;
(d) repeatedly writing at said station a sub-packet of digital information in the transmission ring into a time slot of the channel obtained;
(e) repeatedly reading at said addressed station the sub-packet of information in a time slot of the given channel in the ring;
(f) writing the channel number which is no longer required after the transmission of the digital information, into a time slot of the monitor receive channel after reading the channel number present there; and
(g) repeating step (f) with the read information until the read channel number is a "nihil" channel number.

2. A method of transmitting digital information as claimed in claim 1, wherein one of said time slot types is a second, packet-switched category, and the channel number specified in step (c) when said packet switched category is used is transmitted in a message field, and an identification of the transmitting station and an identification of the addressed station is transmitted in the message field.

3. A method of transmitting digital information as claimed in claim 1, wherein a channel to be utilized for transmitting is a first, circuit-switched category time slot type and, step (c) of the method comprises the following sub-steps:

(i) the station reads a channel number of a second, packet-switched category in the relevant time slot of the monitor transmit channel and writes a "nihil" channel number there;

(ii) step (i) is repeated until the read channel number is a "non-nihil" channel number;
(iii) the station transfers the obtained channel number of the packet-switched category to the address station in a message field;
(iv) the station transmits through the packet-switched channel the channel number to be utilized of the first circuit-switched category and also any further, customary signalling data;
(v) the channel number of the second, packet-switched category which is no longer required after the transmission of the data defined in step (iv) is written into a time slot of the relevant monitor receive channel after reading the channel number present there; and
(vi) repeating the preceding step with the read information until the read channel number is a "nihil" channel number.

4. A method as claimed in claim 1, 2 or 3, where the channel numbers received in the time slots of the monitor receive channel and which are no longer utilized are redistributed by the monitor over the time slots of the monitor transmit channel.

5. A method as claimed in claim 1, 2 or 3, wherein a monitor receive channel and a monitor transmit channel are allocated separately for each type of channels.

6. A method as claimed in claim 2, wherein step (c) comprises the following sub-steps:

(i) the content of the message field is read by the transmitting station and the station's own message is written-in;
(ii) the content of the read message field is repeatedly replaced by the content of the message field in the immediately preceding frame until its own message is read; and
(iii) the station's own message is removed from the transmission ring.

7. A method as claimed in claim 2 or 3, wherein the message field comprises an indicator indicating whether the message field is filled or not filled and that step (c) comprises the following sub-steps:

(i) the station gives the value "filled" to the indicator of a passing message field after the indicated value thereof has been read;
(ii) if the value of the read indicator is "filled" then the preceding step (i) is repeated;
(iii) if the value of the read indicator is "not filled" then a message is written in the remaining portion of the message field; and
(iv) after the message field thus filled has circulated through the ring the indicator of the relevant message field is given the value "not filled".

8. A method as claimed in claim 7, wherein the indicator is a one-bit word.

9. A method as claimed in claim 2 or 3, wherein in each frame a further time slot is reserved for transmitting receiver arbitration messages between the stations, that the corresponding time slots in consecutive frames form together an arbitration channel and that a receiver-arbitration message comprises a receiver address and an arbitration indicator and that step (a) of the method is preceded by the following steps of the station wishing to transmit information:

(i) a station wishing to transmit information reads the content of a time slot of the arbitration channel and writes in that time slot the address of the desired receiver station with as an arbitration indicator the value "false";

(ii) the content of the read time slot of the arbitration channel is repeatedly replaced by the content of a time slot of the arbitration channel in the preceding frame until it is read with an arbitration indicator of the value "true"; and (iii) the transmitting station thereafter knows that the addressed station is reserved for it; and that each free station performs the following steps:

(iv) a free station reads the contents of an arbitration channel time slot and writes its own address into that time slot and gives the arbitration indicator the value "true";

(v) a free station swaps the content of the read time slot in the arbitration channel for the content of a time slot of the arbitration channel in the preceding frame until its own address is read and the arbitration indicator has the value "false"; and (vi) the free station which has read its own address and an arbitration indicator having the value "false" is placed in a "busy" state.

10. A method as claimed in claim 9, wherein repeating step (ii), places on the ring a message with the indicator "false", is effected a limited number of times whereby if the arbitration indicator in the arbitration channel time slot circulated in the ring has kept the value "false" after the limited number of repetitions, the station wishing to transmit information executes the following steps:

(vii) the station wishing to transmit information reads the content of the arbitration channel time slots in the consecutive frames until the address of the station for which the information is intended is read and the associated arbitration indicator has the value "true";

(viii) the station wishing to transmit information reads the content of an arbitration channel time slot and writes the address of the desired receiver station in that time slot and gives the arbitration indicator the value "false";

(ix) the content of the read arbitration channel time slot is repeatedly swapped for the content of an arbitration channel time slot in the preceding frame until the receiver station is read;

(x) if the arbitration indicator read in step (ix) has the value "false" then step (vii) is the following step; if the indicator has the value "true" then the station knows that the receiver is reserved for it; and that the repetition defined in step (v) of renewed placing on the ring its own, received back message is performed once, that if after the limited number of repetitions the arbitration indicator in the arbitration channel time slot circulated in the ring has retained the value "true" each free station continues by effecting the following steps:

(xi) a free station reads the content of the arbitration channel time slots in the consecutive frames until its own address is read;

(xii) a free station reads the content of an arbitration channel time slot and writes its own address into that time slot;

(xiii) a free station swaps the content of the read arbitration channel time slot for the content of an arbitration channel time slot in the preceding frame until its own address is read whereby the arbitration indicator will now have the value "true" and the receiver knows it is reserved.

11. A method as claimed in claim 2, wherein the information is divided into two packets of a predetermined maximum length, which packets each comprise a plurality of sub-packets of a predetermined length, that the message field utilized in step (c) further comprises a first sub-field for indicating the number of sub-packets a packet comprises, a second sub-field for indicating whether the sub-packet to be transmitted is the last or not the last one of the packet and a third sub-field for accommodating the channel number.

12. A method as claimed in claim 11, wherein the channel number is no longer required in step (vi) if the last sub-packet of the packet has been transmitted, that the steps (vi) and (vii) are performed by the addressed station and that the addressed station reports to the transmitting station in a message field whether the packet has been correctly received or not correctly received.

13. A method as claimed in claim 11, wherein a packet comprises an error detecting code which is transmitted together with the last sub-packet of the packet.

14. A ring-access unit, having an input coupled to a ring transmission means in which frames formed by digital information circulate, the unit comprising an input memory, an output memory, a switching memory, a buffer memory, a bus and a multiplexer, the input of the ring-access unit being connected to an input of the input memory for cyclically writing a frame digital information, and to a first input of the multiplexer, an output of the input memory device being connected to the bus by which the information stored in the input memory is applied to a station connected to said bus through the buffer memory, an input of both the output memory and the switching memory are connected to the bus for writing information in specific addresses in the output memory whose addresses are indicated by a flag in the switching memory associated with the output memory, an output of the output memory being coupled to a second input of the multiplexer and an output of the switching memory being coupled to a control input of the multiplexer for connecting under the control of the switching memory the first or the second input of the multiplexer to an output thereof.

15. A system of transmitting digital information between a plurality of stations which are coupled to a unidirectional transmission ring, the ring comprising a monitor for generating a frame in the ring, which frame carries a plurality of types of time slots which types differ from each other in the number of bits which can be accommmodated in the time slots, time slots of the same type forming in consecutive frames a corresponding number of numbered channels for transmitting the digital information between the stations, said frame comprises at least one time slot for transmitting the channel numbers to be utilized from the monitor to the stations and the relevant corresponding time slots in consecutive frames form together a monitor transmit channel, at least one time slot per frame is provided for transmitting channel numbers which are no longer utilized from the stations to the monitor, and the corresponding time slots in consecutive frames form together a monitor receive channel, at least one time slot comprising message field is provided for transmitting protocol messages from one station to another addressed station, and a station comprises:

channel number swapping means, which in order to obtain a channel to be utilized, repeatedly reads a channel number from the time slot of the monitor transmit channel and enter there a dummy channel number ("nihil") until the read channel number is a "non-nihil" channel number;

transmitting means for transferring the obtained channel number to be utilized to the addressed station;

information writing means for repeatedly writing a sub-packet of digital information in the transmission ring into a time slot of the channel obtained;

information reading means for repeatedly reading the sub-packet of information in a time slot of the given channel in the ring, and said channel number swapping means for repeatedly writing the channel number which is no longer required after the transmission of the digital information into a time slot of the monitor receive channel, the channel number present there being read the read channel number being a "nihil" channel number.

16. A system of transmitting digital information as claimed in claim 15, wherein in the event that the channel to be utilized is a time slot of a packet-switched category, the channel number is transmitted in a message field and in the message field an identification of the transmitting station and an identification of the addressing station is transmitted.

17. A system of transmitting digital information as claimed in claim 15, wherein in the event that the channel to be utilized is of a first, circuit-switched category the channel number swapping means of a station repeatedly:

reads a channel number of a second, packet-switched category in the relevant time slot of the monitor transmit channel and writes a "nihil" channel number there until the read channel number is a "non-nihil" channel number, that the transmitting means transfers the obtained channel number of the packet-switched category to the address station in a message field, that the transmitting means transmit through the packet-switched channel the channel number to be utilized of the first circuit-switched category and also any further, customary signalling data and that the channel number swapping means are utilized for repeatedly writing the channel number of the second, packet-switched category which is no longer required after the transmission of the data into a time slot of the relevant monitor receive channel, the channel number present there being read until the read channel number is a "nihil" channel number.

18. A system as claimed in claim 15, 16 or 17, wherein the channel numbers received in the time slots of the monitor receive channel and which are no longer utilized are redistributed by the monitor over the time slots of the monitor transmit channel.

19. A system as claimed in claim 15, 16 or 17, wherein a monitor receive channel and a monitor transmit channel are allocated separately for each type of channels.

20. A system as claimed in claim 16, wherein the channel number swapping means of a station repeatedly reads the content of the message field and writes the station's own message in it until its own message is read, whereupon the station's own message is removed from the transmission ring.

21. A system as claimed in claim 16 or 17, wherein the message field comprises an indicator indicating whether the message field is filled or not filled and the channel number swapping means of a station further comprise indicator swapping means for repeatedly writing the value "filled" to the indicator of a passing message field after the indicated value thereof has been read until the value of the read indicator is "not filled" whereupon a message is written in the remaining portion of the message field and that the indicator swapping means give the indicator of the relevant message after the message field has circulated through the ring on passing, the value "not filled".

22. A system as claimed in claim 21, wherein the indicator is a one-bit word.

* * * * *